G. D. MAXSON.
MECHANICAL STARTER FOR INTERNAL COMBUSTION ENGINES.
APPLICATION FILED JUNE 8, 1917.

1,264,951.

Patented May 7, 1918.
2 SHEETS—SHEET 1.

Inventor
G. D. Maxson

By Hubert Peck, Attorney

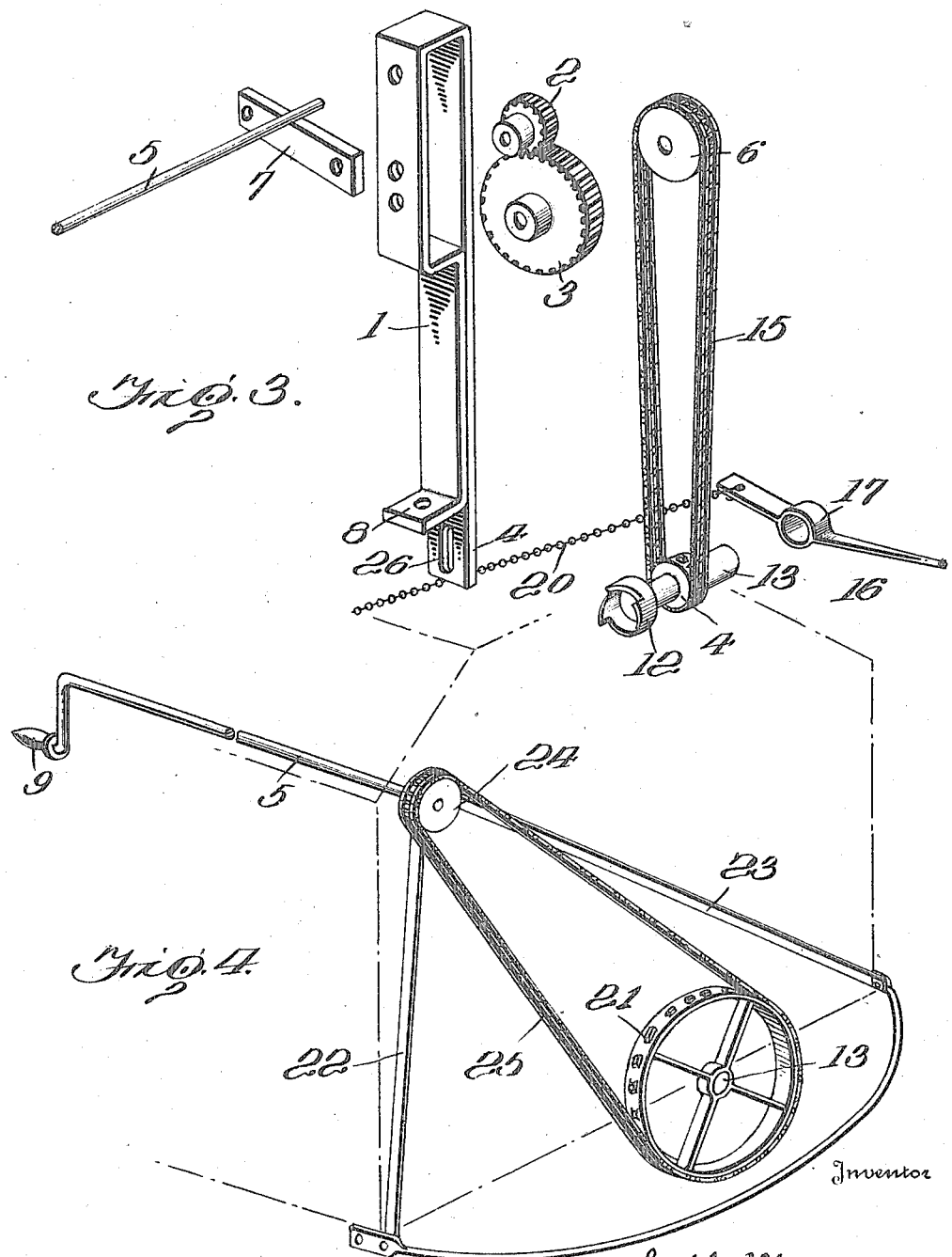

UNITED STATES PATENT OFFICE.

GEORGE D. MAXSON, OF WEST EDMESTON, NEW YORK.

MECHANICAL STARTER FOR INTERNAL-COMBUSTION ENGINES.

1,264,951. Specification of Letters Patent. Patented May 7, 1918.

Application filed June 8, 1917. Serial No. 173,572.

*To all whom it may concern:*

Be it known that I, GEORGE D. MAXSON, a citizen of the United States of America, and resident of West Edmeston, county of Otsego, and State of New York, have invented certain new and useful Improvements in and Relating to Mechanical Starters for Internal-Combustion Engines, of which the following is a specification.

This invention relates to certain improvements in and relating to engine starting devices and the objects and nature of the invention will be readily understood by those skilled in the art in the light of the following explanation of the accompanying drawings illustrating what I now believe to be the preferred embodiment and mechanical expression of my invention from among other forms and arrangements within the spirit and scope thereof.

It is an object of the invention to provide an engine starter adapted particularly for attachment to and in connection with motor vehicles.

It is a further object of the invention to provide an engine starter for motor vehicles which can be readily applied thereto without reconstructing the existing arrangement and construction of motor and vehicle, and which will be applicable and adapted for attachment to various types of motor vehicles driven by internal combustion engines.

It is a further object of the invention to provide an engine starter for motor vehicles which can be operated mechanically from the driver's seat.

It is a further object of the invention to provide an arrangement where motor vehicle engines can be started, which consists of a series of connected gears adapted to rotate the engine shaft and a crank operable from the driver's seat to rotate said gears and engine shaft and thereby start the engine.

It is a further object of the invention to provide an arrangement whereby a motor vehicle engine can be cranked or started by the driver when in his seat and with a very small expenditure of power as compared to that necessary to crank a motor-vehicle engine provided with the usual crank connected directly to the engine shaft.

It is a further object of the invention to provide a motor vehicle engine starting arrangement which is composed of a few simple elements, which may be installed in motor vehicles of various types by an inexperienced person and without interfering with the existing arrangement of engine and vehicle, and of such simple construction that it can be manufactured at small cost.

Further objects, and objects relating to structural details, will definitely appear from the detailed description appearing hereinafter.

The invention consists in certain novel features in construction and in combinations and arrangements as more fully and particularly set forth and specified hereinafter.

Referring to the accompanying drawings:—

Fig. 3, is a perspective view of my invention with the elements thereof disassembled.

Fig. 4, is a perspective view of a modification of my invention.

My invention contemplates a mechanism which is adapted to be attached to a motor vehicle, so that, the engine thereof can be readily started from the operator's seat by means located at a point within reach of the operator when in driving position, and it further contemplates mechanism which reduces the power necessary to start the engine, as compared to that necessary to directly rotate the engine shaft, as in the prevailing arrangements for cranking motor vehicle engines.

The mechanism comprises a series of gears mounted in a frame or bracket which is adapted to be bolted or otherwise fastened, to the engine or points adjacent thereto, and a connection between these gears and the engine shaft, so that, when the gears are rotated they will, through the connection, rotate the engine shaft. A shaft is provided operatively connected with the gears and which shaft terminates in a crank or handle at a point within reach of the driver's seat, and means are also provided, adapted to be actuated by the driver, for engaging and disengaging the series of gears and the connecting element, with and from the engine shaft.

Figure 1:
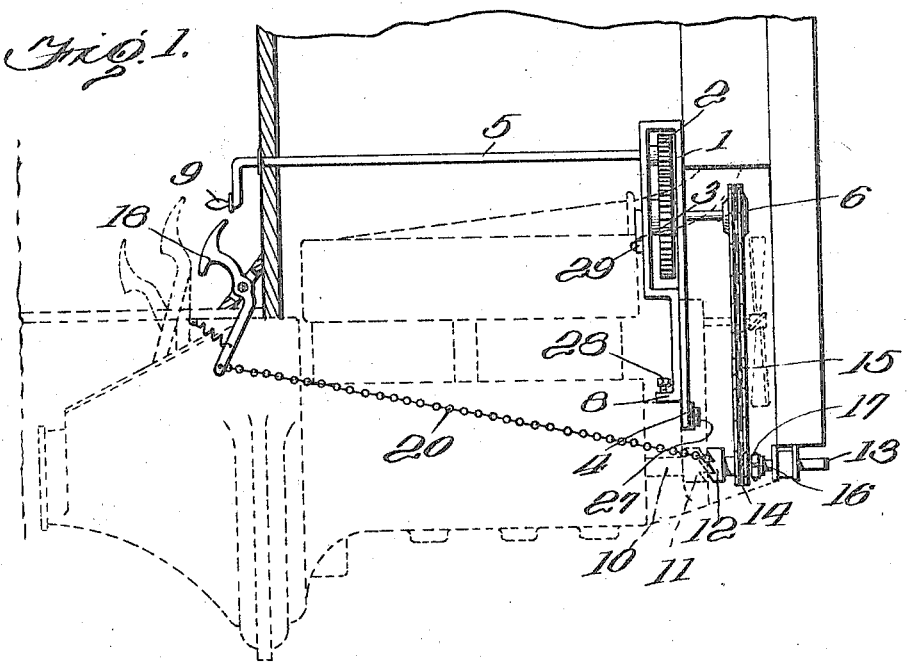
Figure 1, is a side elevation of my invention applied to the engine of a motor vehicle, portions of the engine and vehicle being shown in dotted lines.
Figure 2:
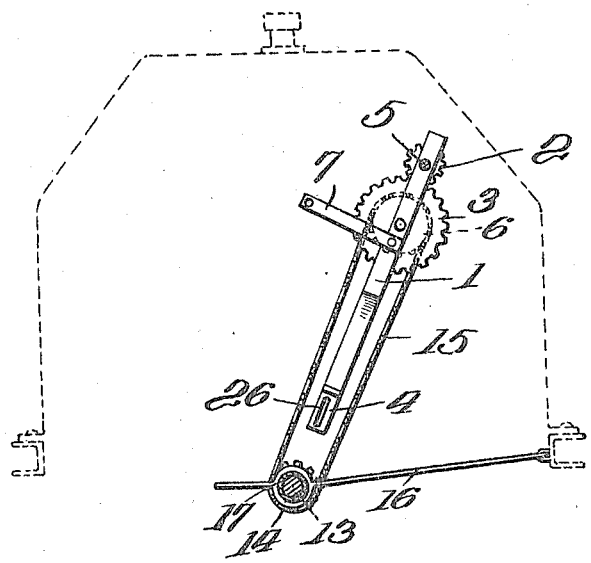
Fig. 2, is a front elevation of my invention applied to a vehicle.

In the drawings, I have shown some, but not all, of the variations and modifications which my invention may take but my preferred form is that disclosed in Figs. 1 to 3 of the drawings. A frame or bracket 1 has the two gears 2 and 3, mounted therein and in mesh with each other and the lower gear 3 of considerably greater diameter than the upper gear 2. The preferred ratio of the two gears is 4 to 1, although, of course, any desired ratio between these gears may be provided. The bracket or frame 1 is formed of two spaced strips joined together at their ends and one end of the bracket formed by the joined ends of the strips extended to form the portion 4 which is adapted to be fastened at some point and form one of the supports for the frame 1. The gears 2 and 3 are mounted between the strips of the frame, in the spaced portion thereof, and have their axes journaled in these strips. The axis of the gear 2 is formed by the shaft 5 which extends a distance beyond the frame 1 and is adapted to have a crank handle attached thereto. This shaft 5 and crank handle will be referred to in detail hereinafter. Gear 3 has its axis extended a comparatively short distance beyond the frame 1 and is provided with a gear or sprocket wheel 6, keyed thereon and revoluble therewith.

The supporting bracket is located under the hood in front of the engine and behind the radiator, and is preferably arranged in an upright position inclined laterally from the vertical to avoid other parts in front of the engine. The bracket is preferably supported from its lower end where it is suitably bolted or otherwise secured to a fixed part of the engine or to the engine bed, while the free or upper part of the bracket is braced by a lateral brace or link 7, coupled thereto, and to a normally fixed member at the upper part of the engine by bolt 29. In the example illustrated, I show the lower end of the bracket formed with a rigid lateral supporting foot or base 8 adapted to rest on the engine bed or other fixed part and to be adjustably secured thereto by vertically adjustable bolt 28, extending through a bolt hole in said base. The lower end of the bracket is also formed with a rigid depending arm or portion 4, extending down at a vertical face of the engine bed or rigid part and clamped thereto by bolt 27, extending through a vertically elongated slot or bolt hole 26 in said arm 4. With the frame or bracket fastened in the above manner, it is possible to adjust the same by loosening bolts 27 and 28 and raising or lowering the frame 1 until the desired position is obtained and then tightening the bolts, which will set the frame in the position desired. When fastened in this manner to the engine of a motor vehicle, the frame with its gears extends angularly from the side of the engine and is thus clear from any mechanism located between the front of the engine and the radiator, or front portion of the hood. A shaft 5 is then extended from the dash or control board of the vehicle and is connected to the axis of gear 2. Shaft 5 is provided with a crank 9 forming a handle with which shaft 5 can be rotated to revolve gears 2, 3 and 6.

The construction and arrangement for manually starting motor vehicle engines by directly rotating the engine shaft, can be utilized with the starting mechanism of my invention, although it is preferable that the crank of the common method be removed from the shaft which directly engages the engine shaft.

In the drawings, I show the engine shaft 10 terminating a distance forwardly of the engine and provided with a clutch member 11 which is adapted to be engaged by a complementary clutch member 12 carried by the longitudinally-movable shaft 13 which is spring controlled and held normally away from shaft 10 with the clutch member 12 disengaged from the engine shaft clutch member 11. A sprocket wheel 14 is keyed to the shaft 13 so that it lies in the same vertical plane as the sprocket wheel 6 carried by the axis of gear 3. A chain 15 connects the sprocket wheel 6 on the axis of gear 3, with the sprocket 14 keyed to shaft 13, whereby any rotation of gear 3 and sprocket 6 is transmitted by the chain 15 to sprocket 14 which in turn rotates the shaft 13.

The shaft 13 is spring controlled, that is, a spring or equivalent mechanism maintains the shaft 13 and clutch member 12 normally out of engagement with the engine shaft 10. I provide an arrangement for moving the shaft 13 longitudinally with respect to engine shaft 10, so the clutch member 12 will engage the clutch member 11 keyed to the engine shaft, which consists of a foot controlled pedal connected to the shaft in such a manner, that operation of the pedal draws shaft 13 to throw clutch members 11, 12 into operative engagement. A lever 16 is pivoted at any suitable point to the frame of the vehicle and is provided at one end with a collar 17 which is mounted on shaft 13 and through which this shaft can freely rotate. On the flooring of the vehicle within reach of the driver a pedal 18, or the like lever, is pivoted and has its lower end connected by a chain 20 to the end of lever 16 which carries the collar 17.

The various elements of my invention being assembled on and attached to a motor vehicle, as pointed out hereinbefore, the operation of the device is as follows:

The driver when in position in his seat, presses pedal 18 which, through chain 20, lever 16, and collar 17, draws the shaft 13 and clutch 12 into engagement with the engine shaft 10. The driver then grasps the crank handle 9, which is located within easy reach on the dash of the vehicle, and turns the same. By thus turning crank 9 gear 2 is rotated which rotates gear 3, and sprocket 6, and through the chain 15, and sprocket 14, the shaft 13 is rotated. During the rotation of the shaft 13 and clutch 12, the driver maintains the clutch 12 in engagement with the engine shaft 10 and through the rotating shaft 13 and the engaged clutch engine shaft 10 is rotated which will start the engine. Immediately the engine is started, the driver releases the clutch 12 from engagement with the engine shaft and ceases rotation of crank handle 9. The operating means then assumes its normal position and is ready for operation whenever it is desired to again start the engine.

In Fig. 4, I have shown a modification of my invention which permits its attachment on the outside of the vehicle, that is, not inclosed by the engine hood. It comprises a comparatively large sprocket wheel 21 which is mounted on the usual construction and arrangement of hand operated crank shaft 13. Standards or braces 22 and 23 are fastened a distance apart on the frame, or other suitable parts of the vehicle and meet at their upper ends to form a bearing and support for a small sprocket wheel 24. The sprocket 24 is connected to a shaft 5 which terminates on the dash of the machine in the crank handle 9, so that sprocket 24 can be revolved by turning the crank handle. A chain 25 connects the small sprocket 24 with large sprocket 21. The ratio of the two sprockets is preferably about four to one.

A pedal and chain connection similar to that hereinbefore mentioned, is used to draw the shaft 13 into engagement with the engine shaft.

The operation of this modification is similar to that of my preferred construction and arrangement described hereinbefore. The driver through the foot pedal draws shaft 13 into engagement with the engine shaft and the crank 9 is then turned which revolves sprocket 24, and through chain 25 and sprocket 21, rotates shaft 13. The shaft 13 being in engagement with the engine shaft, the same is rotated and the engine started, whereupon the various elements are permitted to assume their normal inactive positions.

My invention as described and shown, is capable of attachment to motor vehicles of various types and avoids the necessity of having to start the car by turning a crank directly connected to the engine shaft. Through the arrangement of shafts and gears the driver can remain in his seat and start the engine with little effort, due to the ratio between and arrangement of the operating gears.

It is evident that various changes, variations and modifications might be resorted to without departing from the spirit and scope of my invention, and hence I do not wish to limit myself to the exact disclosure hereof.

What I claim is:—

1. A mechanical starter for motor vehicle internal combustion engines, comprising a supporting bracket at its lower end having a foot and depending projection to fit and be bolted to the engine support, said bracket having a lateral brace coupled thereto and adapted to be secured to an adjacent portion of the engine, the upper portion of said bracket being of loop-like formation, a pinion, a gear wheel meshing with and driven by said pinion, said pinion and gear arranged in the bracket, an elongated driving shaft for said pinion adapted to extend through the vehicle dash and be provided with an operating handle, said gear wheel being provided with a shaft projecting beyond said bracket and having a sprocket wheel, a rotary sprocket adapted to be supported in alinement with an normally operatively disconnected from the engine shaft, manually controlled means for establishing operative connection between said sprocket and the engine shaft, and a sprocket chain operatively connecting said sprocket wheel to said sprocket.

2. A mechanical starter for motor vehicle internal combustion engines, comprising a supporting bracket at its lower end having a foot and depending projection to fit and be bolted to the engine support, said bracket having a lateral brace coupled thereto and adapted to be secured to an adjacent portion of the engine, the upper portion of said bracket being of loop-like formation, a pinion in the bracket having an elongated driving shaft adapted to extend through the vehicle dash and be provided with an operating handle, a rotary gear adapted to be supported in alinement with and normally operatively disconnected from the engine shaft, manually controlled means for establishing operative connection between said sprocket and the eninge shaft, and gearing operatively connecting said gear to said pinion.

3. A mechanical starter for motor vehicle internal combustion engines, comprising a supporting bracket to fit and be bolted to the engine support, a pinion, a gear wheel meshing with and driven by said pinion, said pinion and gear arranged in the bracket, an elongated driving shaft for said pinion adapted to extend through the vehicle dash and be provided with an operating handle, said gear wheel being provided with a shaft projecting beyond said bracket and having a sprocket wheel, a rotary sprocket adapted to be supported in alinement with and normally operatively disconnected from the engine shaft, manually controlled means for establishing operative connection between said sprocket and the engine shaft, and a sprocket chain operatively connecting said sprocket wheel to said sprocket.

4. A mechanical starter for motor vehicle internal combustion engines, comprising a supporting bracket at its lower end having a perforated foot and depending slotted projection to fit and be bolted to the engine support, the upper portion of said bracket being of loop-like formation, a pinion, a gear wheel meshing with and driven by said pinion, said pinion and gear arranged in the bracket, an elongated driving shaft for said pinion adapted to extend through the vehicle dash and be provided with an operating handle, said gear wheel being provided with a shaft projecting beyond said bracket, a rotary gear adapted to be supported in alinement with and normally operatively disconnected from the engine shaft, manually controlled means for establishing operative connection between said sprocket and the engine shaft, and gearing from said last mentioned shaft to said gear.

(Signed.) GEORGE D. MAXSON.

Copies of this patent may be obtained for five cents each, by addressing the "Commissioner of Patents, Washington, D. C."